United States Patent
Kuk et al.

(10) Patent No.: US 9,281,709 B2
(45) Date of Patent: Mar. 8, 2016

(54) POWER RECEIVING DEVICE FOR WIRELESS CHARGING AND PORTABLE ELECTRONIC DEVICE HAVING THE SAME

(75) Inventors: Yoon-Sang Kuk, Seoul (KR); Myung-Woock Jeong, Gunpo-si (KR)

(73) Assignee: Hanrim Postech Co., LTD., Gyeonggi-Do (KR)

( * ) Notice: Subject to any disclaimer, the term of this patent is extended or adjusted under 35 U.S.C. 154(b) by 608 days.

(21) Appl. No.: 13/702,945

(22) PCT Filed: Jun. 3, 2011

(86) PCT No.: PCT/KR2011/004109
§ 371 (c)(1),
(2), (4) Date: Dec. 7, 2012

(87) PCT Pub. No.: WO2011/155735
PCT Pub. Date: Dec. 15, 2011

(65) Prior Publication Data
US 2013/0300352 A1    Nov. 14, 2013

(30) Foreign Application Priority Data
Jun. 7, 2010 (KR) .......... 10-2010-0053437

(51) Int. Cl.
*H02J 7/00* (2006.01)
*H02J 7/02* (2006.01)
*H02J 5/00* (2006.01)

(52) U.S. Cl.
CPC .......... *H02J 7/025* (2013.01); *H02J 5/005* (2013.01); *H02J 7/0044* (2013.01)

(58) Field of Classification Search
USPC .......................... 320/108, 139, 150
See application file for complete search history.

(56) References Cited

U.S. PATENT DOCUMENTS

| | | | |
|---|---|---|---|
| 2002/0089305 A1 * | 7/2002 | Park et al. | 320/108 |
| 2008/0303479 A1 * | 12/2008 | Park et al. | 320/108 |
| 2009/0015197 A1 * | 1/2009 | Sogabe et al. | 320/108 |
| 2009/0206791 A1 | 8/2009 | Jung | 320/108 |
| 2011/0187318 A1 * | 8/2011 | Hui et al. | 320/108 |
| 2011/0221391 A1 * | 9/2011 | Won et al. | 320/108 |

FOREIGN PATENT DOCUMENTS

| | | |
|---|---|---|
| JP | 2008-205214 A | 9/2008 |
| JP | 2009-277820 A | 11/2009 |
| KR | 10-2007-0021501 A | 2/2007 |
| KR | 10-2007-0079482 | 8/2007 |
| KR | 10-2007-0079482 A | 8/2007 |
| KR | 10-2008-0081480 | 9/2008 |
| KR | 10-2009-0089941 | 8/2009 |

OTHER PUBLICATIONS

Chinese Office Action mailed Jul. 2, 2014, issued to corresponding Chinese Patent Application No. 201180024681.X.
(Continued)

*Primary Examiner* — Yalkew Fantu
(74) *Attorney, Agent, or Firm* — Stein IP, LLC

(57) ABSTRACT

Disclosed herein are a power receiving device for wireless charging and a portable electronic device having the same. The power receiving device for wireless charging include a body having a receiving space formed therein; and a charging kit detachably received in the receiving space, and including a coil formed to receive power by magnetic coupling with a power supplying device and a charging circuit configured to charge a battery by electromotive force induced in the coil.

9 Claims, 7 Drawing Sheets

(56) References Cited

OTHER PUBLICATIONS

International Search Report dated Feb. 17, 2012, issued in corresponding International Patent Application No. PCT/KR2011/004109.

Korean Office Action dated Mar. 23, 2012, issued in corresponding Korean Patent Application No. 10-2010-0053437.
Japanese Office Action issued Feb. 10, 2015 to Japanese Application No. 2013-514108.

* cited by examiner

POWER RECEIVING DEVICE FOR WIRELESS CHARGING AND PORTABLE ELECTRONIC DEVICE HAVING THE SAME

CROSS-REFERENCE TO RELATED APPLICATIONS

This application is the U.S. national stage of International Application PCT/KR2011/004109, filed Jun. 3, 2011, which claims the benefit of Korean Application No. 10-2010-0053437, filed Jun. 7, 2010 in the Korean Intellectual Property Office. The disclosures of both applications are incorporated herein by reference.

BACKGROUND OF THE INVENTION

1. Field of the Invention

The present invention relates to a power receiving device receiving power in a wireless charging system and a portable electronic device having the same.

2. Description of the Related Art

Generally, a portable electronic device such as a mobile communication terminal, a personal digital assistant (PDA), or the like, is mounted with a rechargeable battery. In order to charge the battery, a separate charging device, providing electrical energy to the battery of the portable electronic device using home commercial power, is required.

Typically, the charging device and the battery include separate contact terminals formed at outer portions thereof, respectively, such that the charging device and the battery are electrically connected to each other by connecting the contact terminals to each other. However, when the contact terminals as described above protrude externally, the contact terminals are not attractive in appearance. Also, the terminals may easily be dirtied or stained with external foreign materials, such that a contact state therebetween easily deteriorates. In addition, when the battery is short-circuited or exposed to moisture due to carelessness of a user, charged energy may be easily lost.

As an alternative to the above-mentioned contact type charging scheme, a non-contact type (wireless) charging system, charging the battery without contact between the terminals of each of the charging device and the battery, has been suggested.

SUMMARY OF THE INVENTION

Although not limited thereto, an object of the present invention is to provide a power receiving device for wireless charging capable of replacing a part for receiving power provided from a power supplying device for wireless charging, and a portable electronic device having the same.

While not limited thereto, according to an embodiment of the present invention, a power receiving device for wireless charging may comprise a body having a receiving space formed therein; and a charging kit detachably received in the receiving space and comprising a coil formed to receive power by magnetic coupling with a power supplying device and a charging circuit configured to charge a battery by electromotive force induced in the coil.

According to an aspect of the invention, the body may comprise a battery cover coupled with a portable electronic device which covers the battery mounted in the portable electronic device.

According to an aspect of the invention, the receiving space may be formed so that the charging kit is received through a side of the battery cover.

According to an aspect of the invention, the receiving space may comprise a surface in parallel with a main surface of the battery cover.

According to an aspect of the invention, the charging kit may further comprise a frame enclosing the coil and the charging circuit and forming an exterior.

According to an aspect of the invention, the coil may be formed to have any one of a substantially circular shape, a substantially rectangular shape, a substantially track shape, a substantially oval shape, and a combination thereof.

According to an aspect of the invention, the charging circuit may comprise a charging terminal connected to a first terminal of the battery.

According to an aspect of the invention, the charging kit may further comprise a shielding member disposed in the frame which blocks leakage of magnetic force of the coil.

According to an aspect of the invention, the frame may comprise first and second parts coupled with each other to form an internal space within which the coil and the charging circuit are disposed.

According to an aspect of the invention, the frame may further comprise a shaft which protrudes from at least one of the first and second parts to support the coil.

According to an aspect of the invention, the charging circuit may comprise a charging terminal formed to be connected to a terminal of the battery, and any one of the first and second part may comprise a terminal slot exposing the charging terminal.

According to an aspect of the invention, the body may comprise a portable electronic device within which the battery is mounted.

White not limited thereto, according to another embodiment of the present invention, a portable electronic device may comprise a body comprising a display and a battery supplying power to the display; and the power receiving device for wireless charging as described above which supplies the power to the battery.

According to an aspect of the invention, the body may further comprise a wireless communication module.

According to an aspect of the invention, the battery may comprise a first terminal connected to the power receiving device for wireless charging; and a second terminal connected to a terminal of the body.

With the power receiving device for wireless charging and the portable electronic device having the same according to embodiments of the present invention configured as described above, a portion of the power receiving device for wireless charging may be replaced as needed.

Furthermore, according to embodiments of the present invention configured as described above, the portion to be replaced may also be used in another power receiving device for wireless charging.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
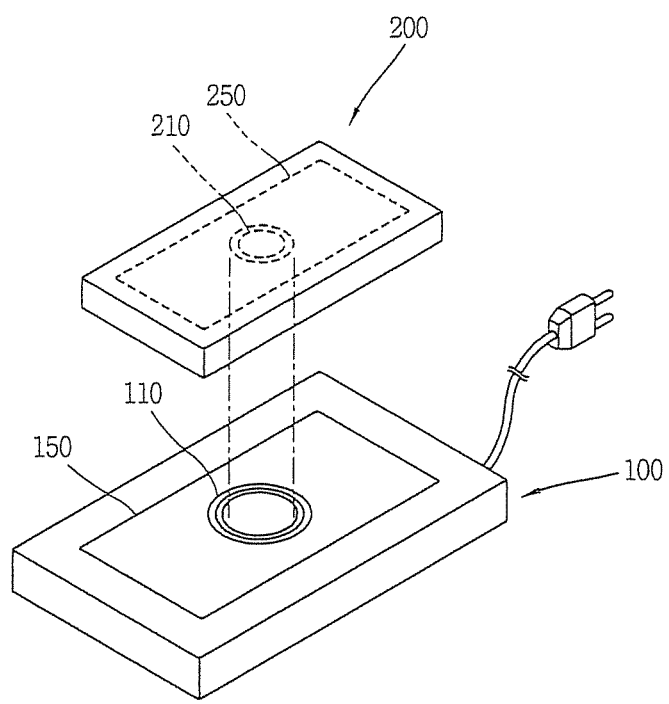
FIG. 1 is a schematic perspective view of a wireless charging system, according to an embodiment of the present invention.

Hereinafter, a power receiving device for wireless charging and a portable electronic device having the same according to embodiments of the present invention will be described in detail with reference to the accompanying drawings, in order to explain the present invention. The embodiments are described below in order to explain the present invention by referring to the figures. In the present specification, throughout the described embodiments of the present invention, similar components will be denoted by the same or similar reference numerals.

FIG. 1 is a schematic perspective view of a wireless charging system according to an embodiment of the present invention.

According to the embodiment shown in FIG. 1, the wireless charging system is configured to comprise a power supplying device 100 and a power receiving device 200 which receives power from the power supplying device 100 without contact in order to charge a battery.

The power supplying device 100 is a device receiving electrical energy supplied from an external power supply to generate charging power to be supplied to the power receiving device 200. The power supplying device 100 may be formed in a pad shape on which the power receiving device 200 may be easily seated thereon. As external power supplied to the power supplying unit 100, alternating current (AC) power, including but not limited to American commercial power (60 Hz, 220V/100V), or direct current (DC) power may be used.

The power receiving device 200 may comprise a battery pack, or a portable electronic device, in which a battery is embedded. In another embodiment, the power receiving device 200 may be a portion of a portable electronic device connected to the battery or a member connected to the battery separately from the portable electronic device. Examples of the portable electronic device may include, but are not limited to, cellular phones, personal digital assistants (PDAs), MP3 players, or the like. The battery, which is a rechargeable battery cell, may comprise a lithium ion battery, a lithium polymer battery, or the like.

The power supplying device 100 and the power receiving device 200 may comprise a primary coil 110 and a secondary coil 210 corresponding to each other, respectively. The primary and secondary coils 110 and 210 are magnetically coupled with each other by induction coupling. Therefore, the secondary coil 210 is juxtaposed on the primary coil 110, such that a magnetic field generated by the primary coil 110 induces a current in the secondary coil 210.

The power supplying device 100 comprises a charging power supplying circuit 150 (see FIG. 2) embedded therein in order to drive the primary coil 110 to generate the magnetic field. The power receiving device 200 comprises a charging circuit 250 (see FIG. 2) embedded therein in order to charge the battery using electromotive force induced within the secondary coil 210.

Figure 2:
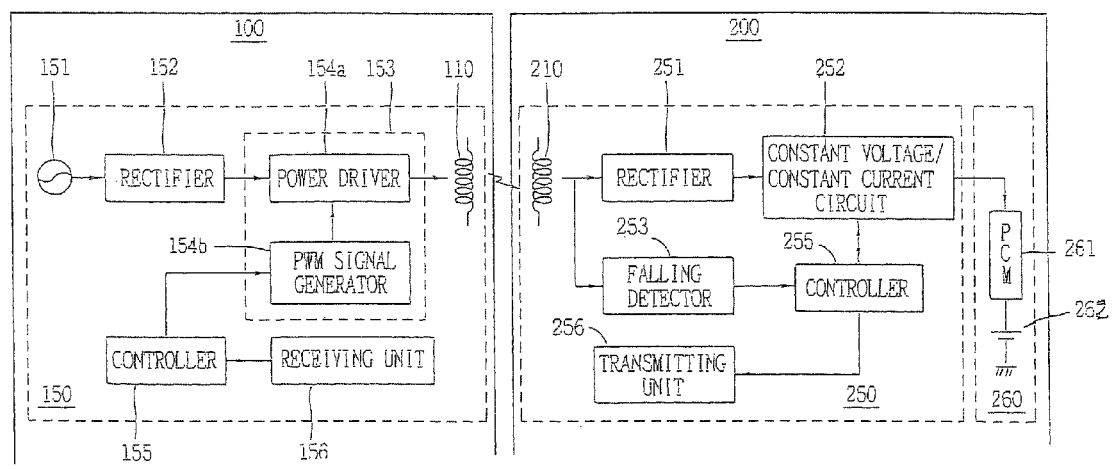
FIG. 2 is an internal functional block diagram of the wireless charging system of FIG. 1.

Hereinafter, referring to the embodiment shown in FIG. 2, one possible detailed configuration of the charging power supplying circuit 150 and the charging circuit 250 will be described. FIG. 2 is an internal functional block diagram of the wireless charging system of FIG. 1.

Referring to FIG. 2, the charging power supplying circuit 150 embedded in the power supplying device 100 may be configured to comprise the primary coil 110, a rectifier 152, a driving circuit 153, a controller 155, and a wireless receiving module 156.

The rectifier 152 rectifies an AC voltage from a commercial AC power supply 151 into a DC voltage and then transfers the DC voltage to the driving circuit 153. The driving circuit 153 generates an AC voltage pulse having a high frequency equal to or larger than a commercial frequency, using the DC voltage rectified by the rectifier 152, and applies the AC voltage pulse to the primary coil 110 to generate the magnetic field.

The driving circuit 153 may comprise a power driver 154a and a pulse width modulation (PWM) signal generator 154b. The power driver 154a may comprise a high frequency oscillating circuit which converts a predetermined level of DC voltage into an AC voltage having a high frequency equal to or larger than a commercial frequency, and a drive circuit which applies a pulse width modulated high frequency AC voltage pulse to the primary coil 110 to drive the primary coil 110. The PWM signal generator 154b may modulate a pulse width of the high frequency AC voltage. Therefore, an output signal transmitted from an output terminal of the power driver 154a may become a high frequency AC voltage pulse. The high frequency AC voltage pulse may be a pulse train of which a pulse width may be controlled by the controller 155. As the driving circuit 153 described above, for example, a switching mode power supply (SMPS) may be adopted.

The controller 155 controls a pulse width of the pulse width modulated high frequency AC voltage pulse based on information on a charged state of the battery, fed back through a wireless transmitting module 256 and the wireless receiving module 156. For example, the controller 155 may change a driving mode of the primary coil 110 from a standby mode into a charging mode when a response signal fed back from the charging circuit 250 is a charging start signal. In addition, the controller 155 may change the driving mode of the primary coil 110 from the charging mode to a fully charged mode when it is judged that the battery is fully charged as a result of analyzing the information on the charged state fed back from the charging circuit 250. Likewise, the controller 155 may maintain the driving mode of the primary coil 110 in the standby mode when a response signal fed back from the charging circuit 250 is not present. It will be recognized that yet other information and corresponding driving modes are possible.

The wireless receiving module 156 may comprise a receiving unit such as a demodulator, which demodulates a feedback response signal transmitted from the wireless transmitting module 256 of the charging circuit 250 as the primary coil 110 receives the feedback response signal, thereby reconstructing the information on the charged state of the battery 262. The wireless receiving module 156 may in some embodiments also comprise an antenna (not shown) which receives the feedback response signal transmitted from the wireless transmitting module 256 of the charging circuit 250, separately from the primary coil 110.

The charging power supplying circuit 150 described above may further comprise an over-current filter circuit which protects the circuit from an over-current, or a constant voltage circuit which maintains the DC voltage rectified by the rectifier at a predetermined level of voltage. The over-current filter circuit may be disposed between the commercial AC power supply 151 and the rectifier 152, and the constant voltage circuit may be disposed between the rectifier 152 and the driving circuit 153.

Next, the charging circuit 250, which receives the power supplied from the charging power supplying circuit 150 to charge the battery 262, will be described. This charging circuit 250 may be embedded within the power receiving device 200.

The charging circuit 250 may comprise the secondary coil 210, a rectifier 251, a constant voltage/constant current circuit 252, a falling detector 253, a controller 255, and the wireless transmitting module 256.

The secondary coil 210 is magnetically coupled with the primary coil 110 to generate induced electromotive force. As described above, when a power signal applied to the primary coil 110 is the pulse width modulated signal, the induced electromotive force induced in the secondary coil 210 is also an AC voltage pulse train. In addition, an AC voltage pulse induced in the secondary coil 210 according to the driving mode of the primary coil 110 may also take any one of the standby mode, the charging mode, and the fully charged mode.

The rectifier 251 is connected to an output terminal of the secondary coil 210 and planarizes the AC voltage pulse induced by the secondary coil 210 to a predetermined level of DC voltage. The constant voltage/constant current circuit 252 generates a constant voltage and a constant current to be charged in the battery 262 using the predetermined level of DC voltage. More specifically, the constant voltage/constant current circuit 252 maintains a current constant mode at the time of an initial charged time of the battery 262 and then changes the constant current mode into a constant voltage mode when a charged voltage of the battery 262 is reached in a saturated state.

The falling detector 253 is a device detecting a descent time of the AC voltage pulse induced by the secondary coil 210; in other words, a falling time. A falling detecting signal is transmitted to the controller 255.

The controller 255, which may be a kind of microprocessor, receives monitoring signals such as the falling detecting signal, a charged current, a charged voltage, and the like, and controls the constant voltage/constant current circuit 252 and the wireless transmitting module 256 based on the monitoring signal. For example, the controller 255 may recognize the descent time of the pulse based on the falling detecting signal input from the falling detector 253, and synchronizes a transmission time of the feedback response signal to be transmitted to the charging power supplying circuit 150 with the descent time of the pulse. The controller 255 may monitor the charged current and the charged voltage of the battery 262, and may temporally store the monitored value in an internal memory (not shown). The memory may store specification information (a product code, a rating, and the like) of the battery 262 as well as the information on the charged state of the battery 262 such as the monitored charged current and charged voltage therein.

In addition, the controller 255 may appropriately select the constant voltage mode or the constant current mode and change between the constant voltage mode and the constant current mode, according to the charged state of the battery 262. The controller 255 may monitor whether an excessive voltage is applied to both ends of the constant voltage/constant current circuit 252, and may generate an request signal for adjusting the charged power when the excessive voltage is applied to both ends of the constant voltage/constant current circuit 252. This adjustment request signal may be fed back to the charging power supplying circuit 150 of the power supplying device 100 through the wireless transmitting module 256.

The monitoring operation on the voltage at both ends of the constant voltage/constant current circuit 252 may be performed by measuring a voltage at a front end and a voltage at a rear end of the constant voltage/constant current circuit 252 and inspecting whether or not a difference between the front and rear voltages exceeds a reference voltage. The wireless transmitting module 256 may comprise a transmitting unit which demodulates a base band signal, such as the information on the charged state, when the secondary coil 210 transmits the feedback response signal (a charging start signal, a charged state signal, an adjustment request signal, or the like) to the charging power supplying circuit 150, thereby generating the feedback response signal. The wireless transmitting module 256 may also comprise an antenna which transmits the feedback response signal to the charging power supplying circuit 150, separately from the secondary coil 210.

A protective circuit module (PCM) 261, which prevents an over-voltage or an over-current from being applied to the battery 262, may be disposed between the constant voltage/constant current circuit 252 and the battery 262. The protective circuit module 261 and the battery 262 may constitute a battery unit 260.

Figure 3:
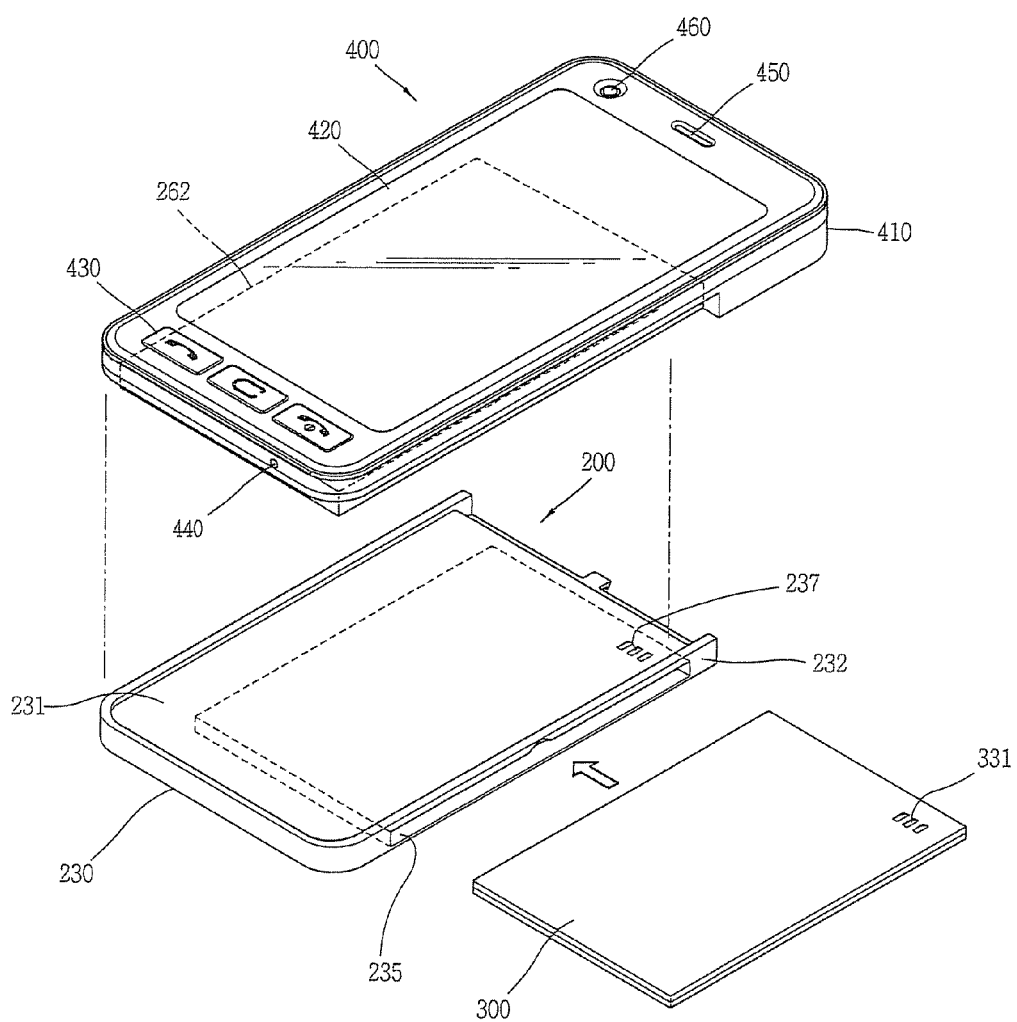
FIG. 3 is an exploded perspective view showing a power receiving device and a mobile communication terminal in which the power receiving device is mounted, according to an embodiment of the present invention.

FIG. 3 is an exploded perspective view showing a power receiving device 200 and a mobile communication terminal 400 in which the power receiving device 200 is mounted, according to an embodiment of the present invention.

Referring to FIG. 3, first, the portable electronic device may be a mobile communication terminal 400 comprising a wireless communication module. The mobile communication terminal 400 may be configured to comprise a body 410, a display 420, operation keys 430, a microphone 440, a speaker 450, a camera 460, and a battery 262. The display 420 may comprise a touch layer capable of performing a touch input. Information inputted using the operation keys 430 may be outputted through the display 420 and the speaker 450. An audio or other sound is received through the microphone 440. Image information is received through the camera 460.

The battery 262 supplies power required for an operation of the display 420, or the like. The battery 262 may be mounted in the body 410 or separated from the body 410, attaches through a rear surface of the body 410. In order to access the battery 262 in embodiments where said battery is mounted in the body 410, a battery cover 230 may be detachably coupled with the rear surface of the body 410.

In the shown embodiment, a charging kit 300 is detachably received in the battery cover 230. The battery cover 230 or the body 410 and the charging kit 300 constitute the power receiving device 200.

The battery cover 230 may comprise a main surface 231 and a side surface 232. In the side surface 232, a receiving space 235 in which the charging kit 300 is received may be opened so as to be in communication with the outside. The charging kit 300 received in the receiving space 235 may be disposed in parallel with the main surface 231. According to the above-mentioned configuration, although the charging kit 300 is inserted, an increase in a thickness of the main surface 231 may be minimized.

The charging kit 300 is a kit receiving power wirelessly supplied from the power supplying device 100 (see FIG. 1) to charge the battery 262.

Although an embodiment in which the charging kit 300 is received in the body which is the battery cover 230 has been described, the charging kit 300 may also be configured to be received in the body 410 of the mobile communication terminal 400. In this case, the body of the power receiving device 200 may become the body 410 of the mobile communication terminal 400. Further, the receiving space 235, which is a space that may be exposed to the outside through the side of the body 410, may be formed in the body 410.

One embodiment of the above-mentioned charging kit 300 will be now described with reference to FIG. 4, which is an exploded perspective view of a charging kit 300.

Figure 4:
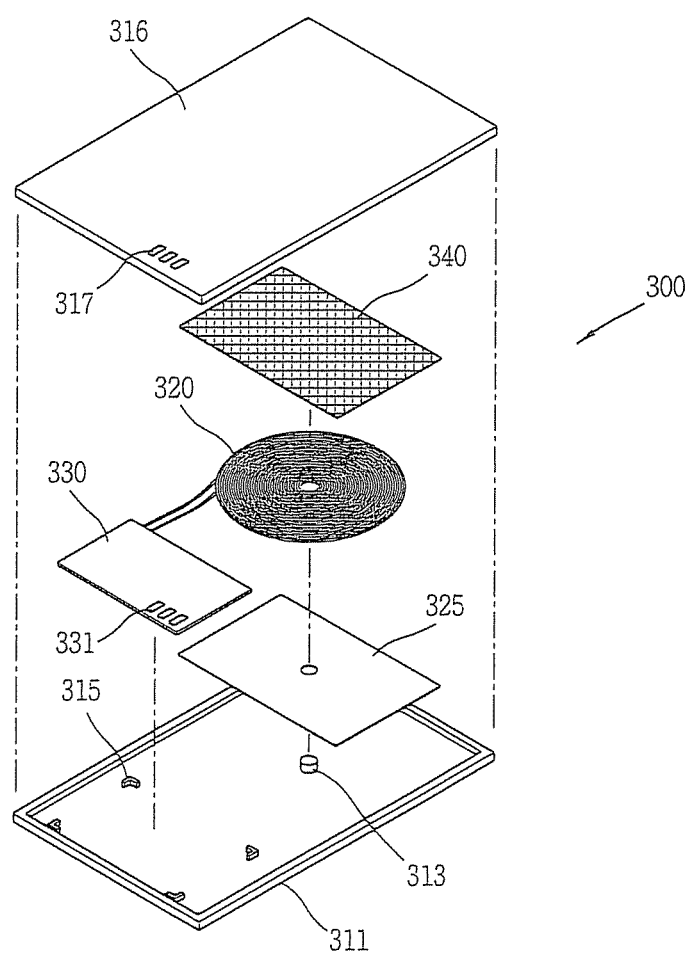
FIG. 4 is an exploded perspective view of a charging kit according to an embodiment of the present invention.

Referring to FIG. 4, the charging kit 300 may be configured to comprise frames 311 and 316, a coil 320, an adhesive member 325, a charging circuit 330, and a shielding member 340.

The frames 311 and 316 are members forming an exterior of the charging kit 300. The frames 311 and 316 may comprise a first part 311 and a second part 316 coupled with each other so as to form an internal space receiving the coil 320, or the like, therein. The first part 311 may comprise a shaft 313 and a rib 315 protruding from an inner surface thereof. The second part 316 may comprise a terminal slot 317 opened therein.

The coil 320 is the secondary coil described by a reference numeral 210 in FIGS. 1 and 2. The coil 320 is magnetically coupled with the primary coil 110 (see FIG. 1) to induce electromotive force. The coil 320 may be wound in a substantially circular shape. The center of the coil 320 may comprise an opening part into which the shaft 313 is inserted.

The adhesive member 325 is disposed between the first part 311 and the coil 320 to adhere the coil 320 to the first part 311. The adhesive member 325 may be, for example, a double-sided tape. The center of the adhesive member 325 may comprise an opening hole corresponding to the shaft 313.

The charging circuit 330 is electrically connected to the coil 320 and allows the electromotive force induced in the coil 320 to be charged in the battery 262 connected through a charging terminal 331. The charging circuit 330 may be fixed to the rib 315.

The shielding member 340 may be disposed between the coil 320 and the second part 316. The shielding member 340 serves to block a magnetic flux leaked from the coil 320 in a direction that deviates from the charging kit 300. The shielding member 340 may comprise a magnetic material, which more effectively creates a magnetic path generated in the coil 320, and an eddy current reducing member formed in a mesh form, which reduces discharge of the magnetic field to the outside. In such embodiments, the magnetic material serves to block the magnetic field from being discharged to the outside of the mobile communication terminal 400, while simultaneously creating the magnetic path to improve a charging efficiency. A further portion of the magnetic field which escapes the magnetic material is blocked by the eddy current reducing member. To assist in this purpose, the magnetic material and the eddy current reducing member may comprise two plates which are stacked so that their main surfaces face each other.

Figure 5:
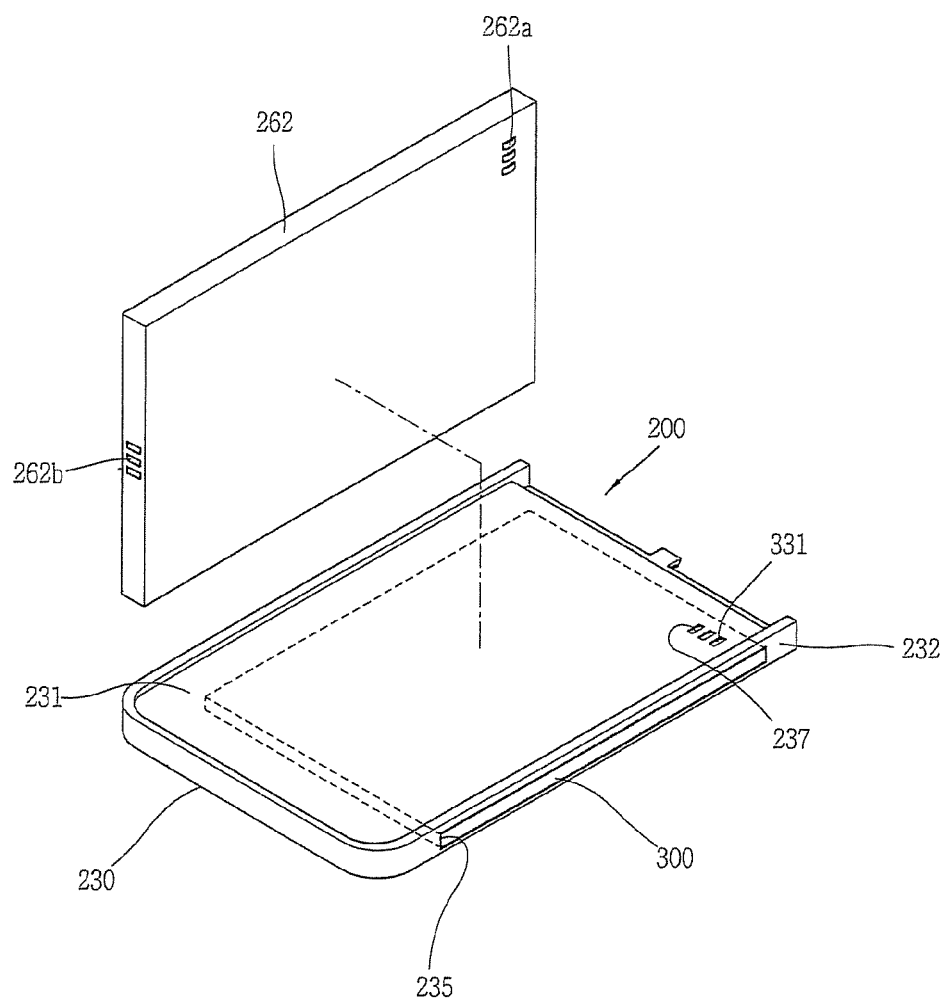
FIG. 5 is an exploded perspective view showing a relationship between a battery and the power receiving device of FIG. 3.

FIG. 5 is an exploded perspective view showing a relationship between a battery 262 and the power receiving device 200 of FIG. 3.

Referring to FIG. 5, the battery 262 may comprise a first terminal 262a and a second terminal 262b that are exposed to the outside. The first terminal 262a may be connected to the charging terminal 331 of the power receiving device 200, and the second terminal 262b may be connected to a terminal of the mobile communication terminal 400 (see FIG. 3).

The power receiving device 200 comprises the body 230 in which the charging kit 300 is embedded as described above. In the shown embodiment, the body 230 is a battery cover coupled with the mobile communication terminal 400 so as to enclose the battery 262. The a main surface 231 of the body 230 comprises an exposing part 237 which exposes the charging terminal 331. The charging terminal 331 exposed to the outside through the exposing part 237 is connected to the first terminal 262a of the battery 262.

According to the above-mentioned configuration, the power induced in the charging kit 300 by the power supplying device 100 (see FIG. 1) is charged in the battery 262 through the charging terminal 331 and the first terminal 262a. The charged battery 262 supplies power to the mobile communication terminal 400 through the second terminal 262b.

Since the charging kit 300 may be separated from the body 230, the charging kit 300 for one body 230 may also be used for another body. Therefore, when there is abnormality in the charging kit 300, it is possible to replace only the charging kit 300 rather than the body 230.

Further, it is also possible for one charging kit 300 to be used in various power receiving devices 200. For example, one charging kit 300 may be used to charge the battery 262 of the mobile communication terminal 400 and may also be used to charge a battery of a portable camera.

Figure 6:
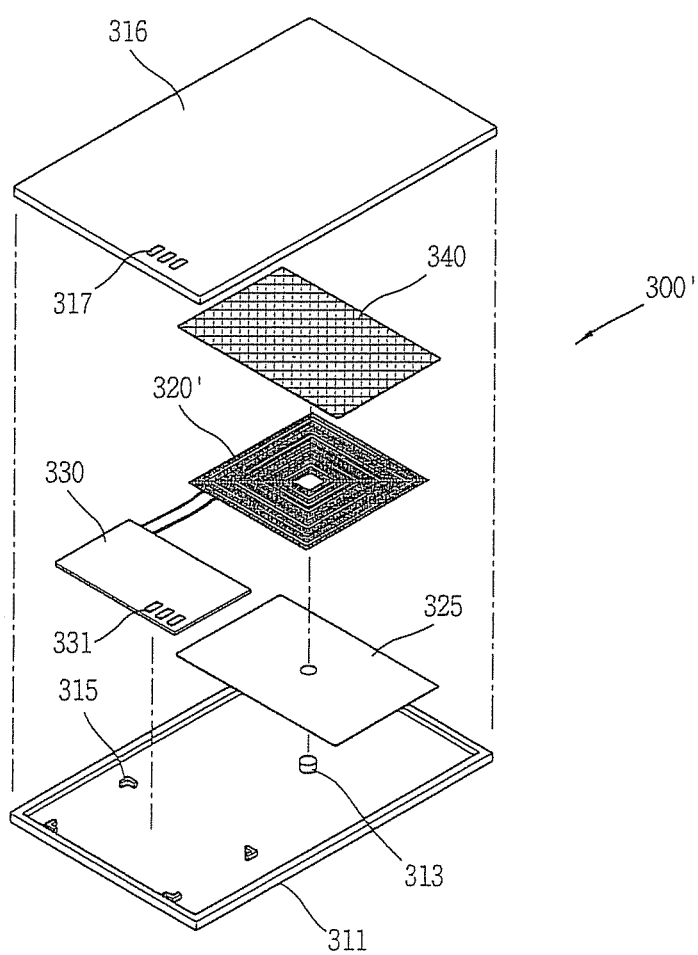
FIG. 6 is an exploded perspective view showing a charging kit according to another embodiment of the present invention.

FIG. 6 is an exploded perspective view showing a charging kit 300' according to another embodiment of the present invention.

Referring to FIG. 6, the charging kit 300' is substantially the same as the charging kit 300 according to the embodiment of the present invention described in FIG. 4, except that a coil 320' is different from the coil 320.

In the present embodiment, the coil 320' is wound in a substantially rectangular shape. Since the coil 320' having the rectangular shape may possess an area greater than the coil 320 having the circular shape, efficiency of magnetic coupling with the primary coil 110 (see FIG. 1) is higher.

Figure 7:
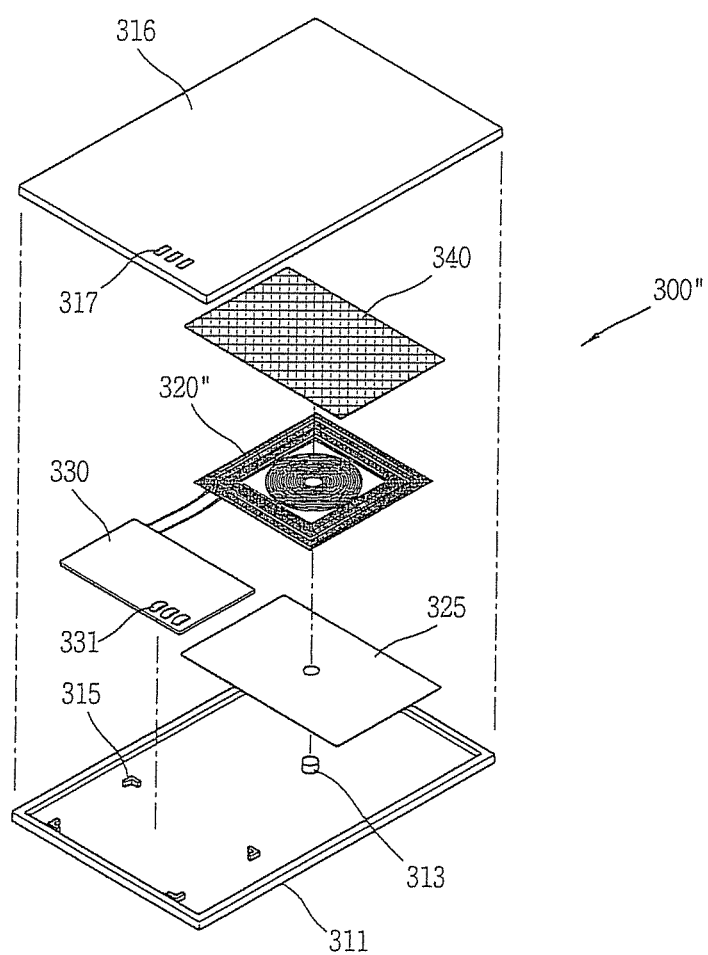
FIG. 7 is an exploded perspective view showing a charging kit according to still another embodiment of the present invention.

FIG. 7 is an exploded perspective view showing a charging kit 300" according to still another embodiment of the present invention.

Referring to FIG. 7, the charging kit 300" is substantially the same as the charging kit 300 according to the embodiment of the present invention described above except that a coil 320" is different from the coil 320.

In the present embodiment, the coil 320" has a complex form in which a coil having a circular shape is disposed in another coil having a rectangular shape. Since the coil 320" having the complex form described above may secure an area wider than the coil 320 having the circular shape, efficiency may be improved. In addition, efficiency of the coil 320" when slight misalignment with the primary coil 110 (see FIG. 1) occurs may also be improved over the coil having the rectangular shape.

It will be further recognized that the coil is not limited to having the circular shape of 320, the rectangular shape of 320', or the complex form of 320", but may also be wound in an oval shape, a track shape, or the like.

The power receiving device for wireless charging and the portable electronic device having the same as described above are not limited to the configuration and the operation scheme of the above-mentioned embodiments. It would be appreciated by those skilled in the art that changes may be made in this embodiment without departing from the principles and spirit of the invention, the scope of which is defined in the claims and their equivalents. The above-mentioned embodiments may also be variously modified through a selective combination of all or some thereof.

The invention claimed is:

1. A power receiving device for wireless charging comprising:
    a body having a receiving recess formed at a side of the body and an exposing hole formed at a portion of the body which defines the receiving recess; and
    a charging kit detachably mounted in the receiving recess, and comprising a coil formed to receive power by magnetic coupling with a power supplying device, a charging circuit configured to charge a battery by electromotive force induced in the coil and having a charging terminal configured to be contacted with a first terminal of the battery, and a frame having a closed space accommodating the coil and the charging circuit and a terminal slot configured to receive the charging terminal and disposed to correspond to the exposing hole.

2. The power receiving device for wireless charging of claim 1, wherein the body comprises a battery cover coupled with a portable electronic device which covers the battery mounted in the portable electronic device,
    wherein the battery cover includes, a main surface where the exposing hole is formed, a side surface where the entrance of the receiving recess is formed, and a hook configured to be coupled with the portable electronic device.

3. The power receiving device for wireless charging of claim 1, wherein the coil is formed to have any one of a circular shape, a rectangular shape, a track shape, a oval shape, and a combination thereof.

4. The power receiving device for wireless charging of claim 1, wherein the charging kit further comprises a shielding member disposed in the frame leakage of magnetic force of the coil.

5. The power receiving device for wireless charging of claim 1, wherein the frame comprises first and second parts coupled with each other to form the closed space.

6. The power receiving device for wireless charging of claim 5, wherein the frame further comprises a shaft which protrudes from at least one of the first part and the second part to support the coil.

7. A portable electronic device comprising:
    a body comprising a display and a battery supplying power to the display; and
    the power receiving device for wireless charging of claim 1 which supplies the power to the battery.

8. The portable electronic device of claim 7, wherein the body further comprises a wireless communication module.

9. The portable electronic device of claim 7, wherein the battery comprises:
    a first terminal connected to the power receiving device for wireless charging; and
    a second terminal connected to a power terminal of the body.

* * * * *